S. D. ADKINS.
FERTILIZER DISTRIBUTER.
APPLICATION FILED SEPT. 13, 1911.
1,033,650.
Patented July 23, 1912.
2 SHEETS—SHEET 2.
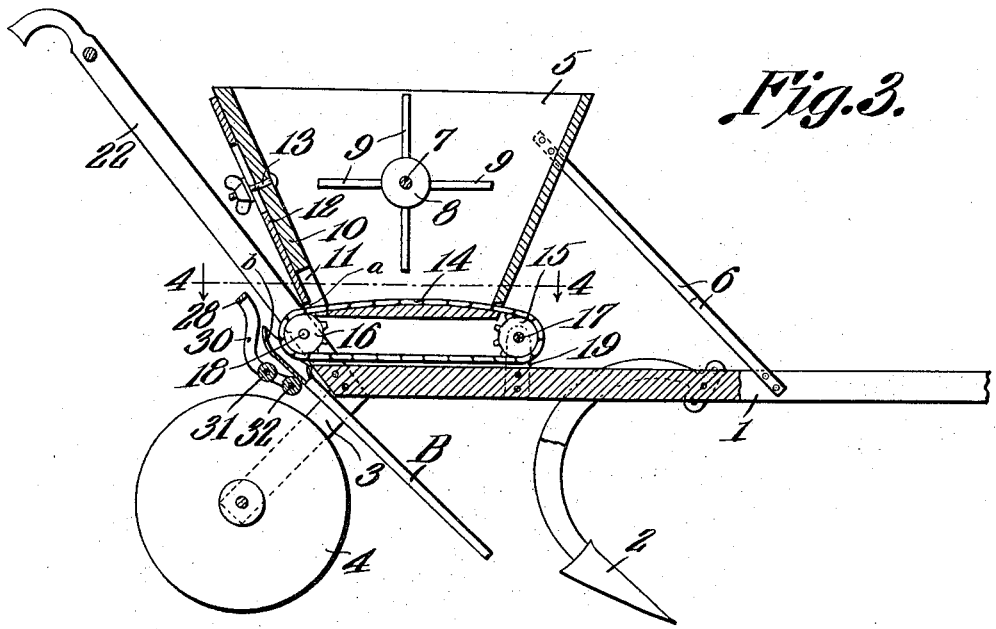
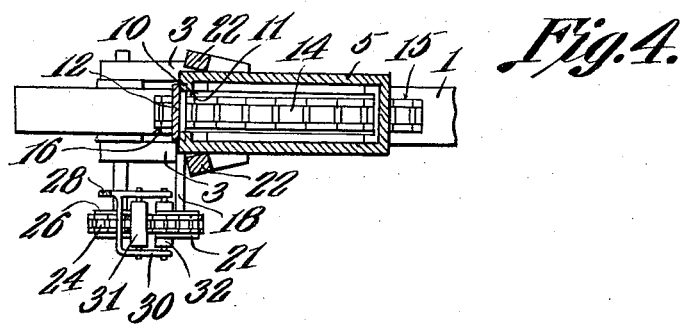
Witnesses
Spurgeon D. Adkins,
Inventor
by C. A. Snow & Co.
Attorneys

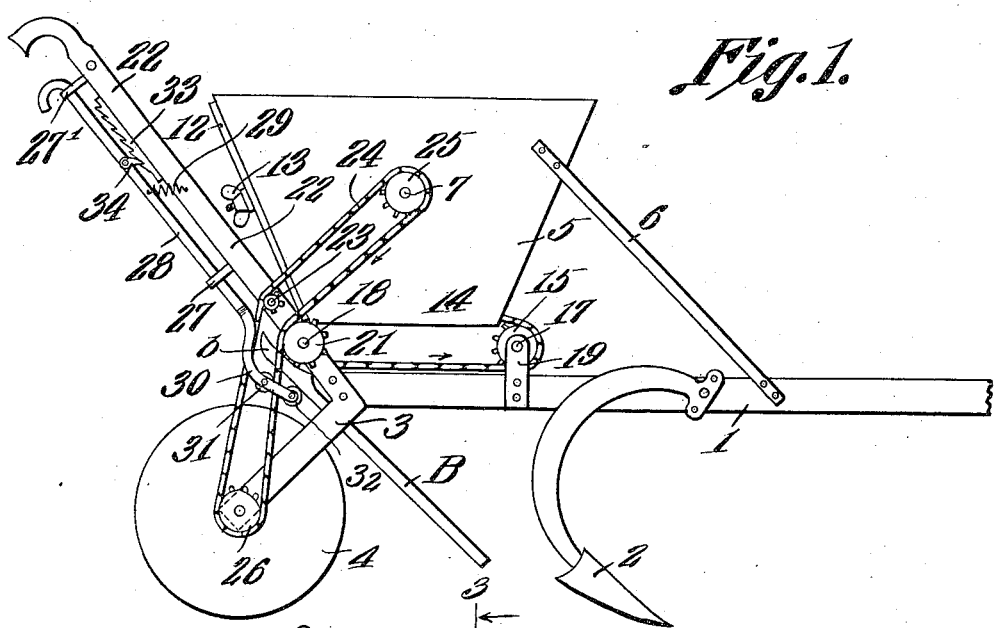

UNITED STATES PATENT OFFICE.

SPURGEON D. ADKINS, OF VIENNA, GEORGIA.

FERTILIZER-DISTRIBUTER.

1,033,650.　　　　Specification of Letters Patent.　　Patented July 23, 1912.

Application filed September 13, 1911. Serial No. 649,006.

*To all whom it may concern:*

Be it known that I, SPURGEON D. ADKINS, a citizen of the United States, residing at Vienna, in the county of Crisp and State of Georgia, have invented a new and useful Fertilizer-Distributer, of which the following is a specification.

This invention relates to improvements in fertilizer distributers, and the primary object of the invention is the provision of a fertilizer distributer embodying an endless fertilizer conveying belt mounted in the hopper thereof, means for adjusting the outlet of the fertilizer therefrom, and a rotary agitator device mounted in said hopper, said rotary agitator device and endless conveyer being operably connected to the drive or traction wheel of the distributer, combined with means operably mounted upon the handle of the machine or distributer for throwing the operating means into and out of engagement with the endless fertilizer conveying belt, whereby the fertilizer may be distributed at will.

A further object of this invention is the provision of a combination of an endless conveyer fertilizer distributer, and means for actuating the power belt for throwing the same into and out of operation with the fertilizer conveying belt, at will.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a side elevation of the complete apparatus. Fig. 2 is a rear elevation thereof. Fig. 3 is a central longitudinal sectional view through the distributer taken on line 3—3 Fig. 2. Fig. 4 is a view taken on the line 4—4 of Fig. 3.

Referring to the drawings, the numeral 1 designates the main frame having at its forward end the furrow forming plow or point 2, and having secured at its rear end the right angled arms or brackets 3, which provide a hanger for the traction wheel 4, the handles 22 being connected at their lower ends of the upper terminal of said brackets.

Mounted upon the rear upper end of the frame or beam 1 is a hopper 5, the same being braced by means of the inclined rods or braces 6 and having mounted transversely in the upper portion thereof the shaft 7, and carries the spool 8 and the agitator arms or plates 9, the agitator being provided to agitate the fertilizer within the hopper. The rear wall 10 of the hopper is provided at its lower end with the outlet opening 11 for the discharge of the fertilizer and the adjustable slide 12 is mounted upon the outer face of said rear inclined wall 10 and is provided with a set screw or adjusting screw 13 whereby the lower end of said slide or gate is held at the proper adjustment to limit the opening *a* for the passage of the fertilizer from the hopper through the medium of the endless conveyer belt 14, which is guided over the sprocket wheels 15 and 16 mounted upon their respective shafts 17 and 18, said conveyer belt being at the forward end of the hopper above the bottom thereof so as to scrape the bottom and deliver the fertilizer between the links thereof through the aperture *a* into the upper end of the fertilizer discharge tube *b* where it may be fed through the inclined length of spout B to the ground in the rear of the furrow point 2. The shafts 17 and 18 are journaled in the respective braces 19 in the forward end and in the upper end of the angled arm 3 at the rear end as clearly shown in Figs. 1 and 3 and upon the outer end of said shaft 18 is mounted a sprocket 21 which is the drive sprocket for the endless belt fertilizer conveyer 14, the same being exterior of the handle 22, and disposed for operable engagement by the sprocket chain 24, which is guided over the idler sprocket 23 carried by the handle 22 and receives motion from the sprocket 26, so that the sprockets 21 and 25 receive simultaneous motion to operate the agitator within the hopper and also the endless fertilizer conveying chain 14.

Carried by one of the handles 22 upon the underside thereof are the guide straps or eyes 27 and 27' for the sliding reception of the spring actuated rod 28, which is normally held downwardly by means of the spring 29 connected thereto and to one of the handles so that its forked end 30 carrying the two idlers or rollers 31 and 32 embracing the lower lead of the sprocket chains 24 will be adapted to be thrown into and out of engagement with said chain to move it toward or away from the sprocket 21 so that the fertilizer distributing chain 14 may be operated or not operated as desired. In order to retain the said chain 24 into the desired frictional contact with the pulley on the shaft 18, the said sliding rod 28 is provided with a pivoted pawl 34 which is adapted to engage with the rack bar or plate 33 carried by the under face of one of the handles 22 as clearly shown in Fig. 1.

By this construction it will be seen that as the fertilizer distributer is pulled or dragged along that the power or traction wheel 4 will transmit motion simultaneously to the agitator 7 within the hopper and also the endless conveyer chain 14, which will convey the fertilizer from the lower portion of the hopper through the aperture *a* into the upper end of spout B where it will be delivered in the furrow formed by the furrow former 2. By use of the sliding rod 28 it will be seen that the tension of the sprocket chain 24 may be regulated or entirely disengaged from the sprocket 21 thereby throwing the chain 24 out of operation as desired.

By means of the adjustable slide in the rear of the hopper the amount of fertilizer carried by the chain may be regulated, the lower end of the said slide being used as a scraper to scrape the surplus fertilizer and retain the same within the hopper as the chain passes therebelow.

What is claimed is:

1. In a fertilizer distributer, a frame, a furrow opener carried thereby, a hopper carried thereby and provided with a discharge outlet, a slide adjustably mounted to regulate the size of the discharge opening and providing a scraper for regulating the amount of fertilizer passing therethrough, an agitator rotatably mounted within the hopper, an endless fertilizer conveying chain disposed in the bottom of the hopper for conveying the fertilizer through the opening thereof, a pair of right angle arms connected to the rear end of the frame, a pair of handles connected to the upper terminals of said arms, a traction wheel journaled in the lower terminals of said arms, a sprocket chain operably connecting the traction wheel, fertilizer conveyer and agitator for operation in unison, and means operably connected to the handle and disposed with relation to one lead of the chain for throwing said lead into and out of engagement with the fertilizer conveyer.

2. In a fertilizer distributer, a frame, a furrow opener carried thereby, a hopper carried thereby and provided with a discharge outlet, a slide adjustably mounted to regulate the size of the discharge opening and providing a scraper for regulating the amount of fertilizer passing therethrough, an agitator rotatably mounted within the hopper, an endless fertilizer conveying chain disposed in the bottom of the hopper for conveying the fertilizer through the opening thereof, a pair of right angled arms connected to the rear of the frame, a pair of handles connected to the upper terminals of said arms, a traction wheel journaled in the lower end of said arms, a sprocket chain operably connecting the traction wheel, fertilizer conveyer and agitator for operation in unison, a rod slidingly mounted upon one of the handles, means carried in the lower end thereof and adapted to be thrown into and out of engagement with the lower lead of the chain to connect and disconnect the same from the fertilizer conveyer, and a spring for normally holding said rod downwardly and the lead of the sprocket chain into engagement with the fertilizer conveyer.

3. In a fertilizer distributer, a frame, a furrow opener carried thereby, a hopper mounted upon the frame and provided with a fertilizer discharge opening in the rear wall thereof, a slide adjustably mounted upon the rear wall thereof and disposed to regulate the size of the opening of the hopper and to act as a scraper, an agitator, an endless chain mounted in the lower end of the hopper and adapted to convey the fertilizer from the bottom of the hopper through the opening thereof and be acted upon by the slide to remove the surplus fertilizer and retain it within the hopper, a pair of right angled arms connected to the rear terminals of the frame, a pair of handles connected to the upper terminals of said arms, a power wheel journaled in the lower terminals of said arms, an idler sprocket carried upon one of said handles, and a sprocket chain operably connecting the traction wheel, endless conveyer belt and agitator together, said chain passing over the idler sprocket of the handle.

4. In a fertilizer distributer, a frame, a furrow opener carried thereby, a hopper mounted upon the frame and provided with a fertilizer discharge opening in the rear wall thereof, a slide adjustably mounted upon the rear wall thereof and disposed to regulate the size of the opening of the hopper and to act as a scraper, an agitator, an endless chain mounted in the lower end of the hopper and adapted to convey the fertilizer from the bottom of the hopper through the opening thereof and be acted upon by the slide to remove the surplus fertilizer and retain it within the hopper, a pair of right angled arms connected to the rear terminals of the frame, a pair of handles connected to the upper terminals of said arms, a power wheel journaled in the lower terminals of said arms, an idler sprocket carried upon one of the handles, a sprocket chain operably connecting the traction wheel, endless conveyer belt and agitator together, said chain passing over the idler sprocket of the handle, a rod slidingly mounted upon one of said handles, two rollers mounted in the lower end thereof and straddling the lower lead of said sprocket chain, a spring connected to the handle and rod for normally holding one of said rollers in engagement with said lead for retaining the lead in engagement with the endless conveyer belt, and co-acting means carried by the rod and handle for regulating the tension of the spring.

In testimony that I claim the foregoing as my own, I have hereto affixed my signature in the presence of two witnesses.

SPURGEON D. ADKINS.

Witnesses:
S. W. CONEY,
SAM CONEY, Jr.

---

Copies of this patent may be obtained for five cents each, by addressing the "Commissioner of Patents, Washington, D. C."